United States Patent
Kalra et al.

(12)

(10) Patent No.: US 11,924,118 B2
(45) Date of Patent: Mar. 5, 2024

(54) DYNAMIC NETWORK RESOURCE AVAILABILITY FOR PLANNED EVENTS

(71) Applicant: Telefonaktiebolaget LM Ericsson (publ), Stockholm (SE)

(72) Inventors: Amit Kalra, Gurgaon Haryana (IN); Gaurav Bhatnagar, Delhi (IN); Aditya Kumar Sinha, New Delhi (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 66 days.

(21) Appl. No.: 17/615,391

(22) PCT Filed: Jul. 1, 2019

(86) PCT No.: PCT/IN2019/050489
§ 371 (c)(1),
(2) Date: Nov. 30, 2021

(87) PCT Pub. No.: WO2021/001842
PCT Pub. Date: Jan. 7, 2021

(65) Prior Publication Data
US 2022/0231969 A1    Jul. 21, 2022

(51) Int. Cl.
*H04L 47/83*    (2022.01)
*H04L 41/14*    (2022.01)
*H04L 41/147*    (2022.01)

(52) U.S. Cl.
CPC .......... *H04L 47/83* (2022.05); *H04L 41/145* (2013.01); *H04L 41/147* (2013.01)

(58) Field of Classification Search
CPC ..... H04L 47/83; H04L 41/145; H04L 41/147; H04L 41/0896; H04L 41/149; H04L 41/16; H04L 43/0876
See application file for complete search history.

(56) References Cited

U.S. PATENT DOCUMENTS 8,121,024 B1    2/2012    Natarajan et al.
9,137,130 B2    9/2015    Driesen et al.
(Continued)

FOREIGN PATENT DOCUMENTS

EP    3021521 A1    5/2016
WO    2017202448 A1    11/2017

OTHER PUBLICATIONS

European Search Report dated May 27, 2022 for European Application No. EP19935930; consisting of 11 pages.
(Continued)

*Primary Examiner* — John A Follansbee
*Assistant Examiner* — Fadi Haj Said
(74) *Attorney, Agent, or Firm* — Christopher & Weisberg, P.A.

(57) ABSTRACT

Disclosed herein is a method for managing network resources of a communication network. The method includes determining a number of expected users to be physically present at a planned event. The expected users are associated with a network operator. The method also includes adapting an amount of available network resources for the network operator in conjunction with the planned event based on the number of expected users. Also disclosed herein is a computer program product, an apparatus and a control node.

16 Claims, 5 Drawing Sheets

(56) References Cited

U.S. PATENT DOCUMENTS

| | | | | |
|---|---|---|---|---|
| 2004/0131167 A1* | 7/2004 | Chang | ............... | H04M 3/56 |
| | | | | 379/202.01 |
| 2005/0209914 A1* | 9/2005 | Nguyen | ............ | G06Q 30/0201 |
| | | | | 705/14.69 |
| 2006/0063550 A1* | 3/2006 | Martin | ............ | H04L 12/1877 |
| | | | | 455/518 |
| 2014/0179266 A1* | 6/2014 | Schultz | ............ | H04M 15/852 |
| | | | | 455/406 |
| 2015/0189532 A1 | 7/2015 | Dimou | | |
| 2015/0207708 A1* | 7/2015 | Raleigh | ............ | H04L 43/062 |
| | | | | 709/217 |
| 2016/0080275 A1 | 3/2016 | Kumaresh et al. | | |
| 2018/0309682 A1 | 10/2018 | Larumbe et al. | | |
| 2019/0116505 A1* | 4/2019 | Bhorkar | ............ | H04L 47/70 |
| 2019/0379592 A1* | 12/2019 | Samadi | ............ | H04L 43/14 |

OTHER PUBLICATIONS

Quercia, Daniele et al.; SpotME If You Can: Randomized Responses for Location Obfuscation on Mobile Phones; 2011 31st International Conference on Distributed Computing Systems; Year: 2011, Cambridge, United Kingdom; consisting of 10 pages.

International Search Report and Written Opinion dated Sep. 19, 2019 for International Application No. PCT/IN2019/050489 filed Jul. 1, 2019, consisting of 6 pages.

\* cited by examiner

DYNAMIC NETWORK RESOURCE AVAILABILITY FOR PLANNED EVENTS

CROSS-REFERENCE TO RELATED APPLICATIONS

This application is a Submission Under 35 U.S.C. § 371 for U.S. National Stage Patent Application of International Application Number: PCT/IN2019/050489, filed Jul. 1, 2019 entitled "DYNAMIC NETWORK RESOURCE AVAILABILITY FOR PLANNED EVENTS," the entirety of which is incorporated herein by reference.

TECHNICAL FIELD

The present invention relates generally to the field of managing network resources in communication networks. More particularly, it relates to pro-actively managing network resources in association with users in the network.

BACKGROUND

With the development of $5^{th}$ generation of networks (also commonly known as next generation of networks, 5G or New Radio networks), there is typically expected a gigantic increase in number of connected devices in the network(s). Further, different devices will typically have different requirements regarding services and features. For example, the proposed broadband speeds for mobile devices in 5G network is 50+ Mbps everywhere there is coverage (maximum supported speed being even more). In addition, the number of services proposed to be offered by 5G will increase significantly, e.g., smart offices, virtual reality, virtual/simulation gaming, remote surgery and the like, which will typically result in further increase in network traffic. Thus, the network congestion in future networks will typically require serious considerations by network service providers.

In the past, different mechanisms have been proposed to handle (and avoid) network congestion. Existing solutions include e.g. both proactive and reactive approaches to handle network congestion in the network. For example, the patent application US20160080275 (titled: "User Prioritization in a Congested Network") discloses means to handle network traffic when the network is already congested by assigning different priorities to different users. Based on identified priorities, the network provider may take informed decisions to optimize the network traffic.

However, there exists a need to have methods and system that will increase the accuracy of predicting the requirements of additional network resources based on the available information.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above disadvantages and to provide methods and apparatuses for enabling proactive resource scheduling and adaption in order to avoid network congestion at e.g. planned events.

According to a first aspect, this is achieved by a method for managing network resources of a communication network. The method comprises determining a number of expected users to be physically present at a planned event, wherein the expected users are associated with a network operator.

The method also comprises adapting an amount of available network resources for the network operator in conjunction with the planned event based on the number of expected users.

In some embodiments, the planned event is a physical event associated with a geographical location being under coverage of the communication network.

In some embodiments, adapting the amount of available network resources comprises obtaining a respective user profile for each of the expected users. The respective user profile comprises information pertaining to historical and/or current data usage for the expected user, and the method comprises adapting the amount of available network resources based on the historical and/or current data usage for the expected users.

In some embodiments, the respective user profile further comprises information pertaining to historical and/or current data usage in conjunction with one or more other events being of a same or similar type as the planned event for the expected user.

In some embodiments, adapting the amount of available network resources is further based on one or more of: a location of the planned event, timings associated with the planned event, an event type, a current network load, and a historical network load.

In some embodiments, the expected users have registered to the planned event prior to the planned event through a registration portal associated with the planned event. Determining the number of expected users further comprises acquiring the number of expected users from the registration portal.

In some embodiments, the method may further comprise determining for each of the expected users whether the expected user is an active user and adapting the amount of available network resources in conjunction with the planned event based on a number of active users of the expected users associated with the network operator.

In some embodiments, the method may further comprise monitoring an actual data usage of each of the expected users during the planned event, storing information pertaining to the actual data usage for each expected user and using the stored information pertaining to the actual data usage for each expected user when adapting available network resources for at least one future event.

In some embodiments, the method may further comprise determining a total number of users expected to utilize network resources in conjunction with the planned event, wherein the total number of users comprises the number of expected users and other users associated with at least one other network operator.

A second aspect is a computer program product comprising a non-transitory computer readable medium. The non-transitory computer readable medium has stored there on a computer program comprising program instructions. The computer program is configured to be loadable into a data-processing unit, comprising a processor and a memory associated with or integral to the data-processing unit. When loaded into the data-processing unit, the computer program is configured to be stored in the memory. The computer program, when loaded into and run by the processor is configured to cause the processor to execute method steps according to the method described in conjunction with the first aspect.

A third aspect is an apparatus for managing network resources of a communication network, the apparatus comprising controlling circuitry configured to cause determination of a number of expected users to be physically present at a planned event, wherein the expected users are associated with a network operator and cause adaptation of an amount of available network resources for the network operator in conjunction with the planned event based on the number of expected users.

In some embodiments, the apparatus is configured to carry out the method according to the first aspect.

A fourth aspect is a control node for a communication network, the control node comprising the apparatus according to the third aspect.

In some embodiments, any of the above aspects may additionally have features identical with or corresponding to any of the various features as explained above for any of the other aspects.

An advantage of some embodiments is that network congestion may be proactively avoided by means of granular network resource adaption.

An advantage of some embodiments is that efficient network utilization may be enabled while still avoiding network congestion by means of proactive and granular network resource adaption.

Another advantage of some embodiments is network resources may be adapted for a given time at a given place for a given network operator, thus providing higher granularity when scheduling network resources.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where network resources are managed for a certain network operator based on a number of users associated with the network operator and expected to utilize network resources at a determined time, e.g. at a planned event.

As mentioned earlier, the development of 5G is most likely going to open up the possibility to have an excessive number of connected devices utilizing a network and its available resources.

Hence network congestion is a problem that is likely to increase. Network congestion is an ever-present problem, and the methods and apparatus as described herein is applicable on not only 5G networks. They could e.g. be applicable in any other known network type, such as 2G, 3G, 4G, etc.

The solutions that exist today for handling network congestion are typically not granular enough to correctly predict the requirements of network resources in case of suspected network congestion (e.g. during a planned event where a large number of users or subscribers are expected to be present.)

Figure 1:
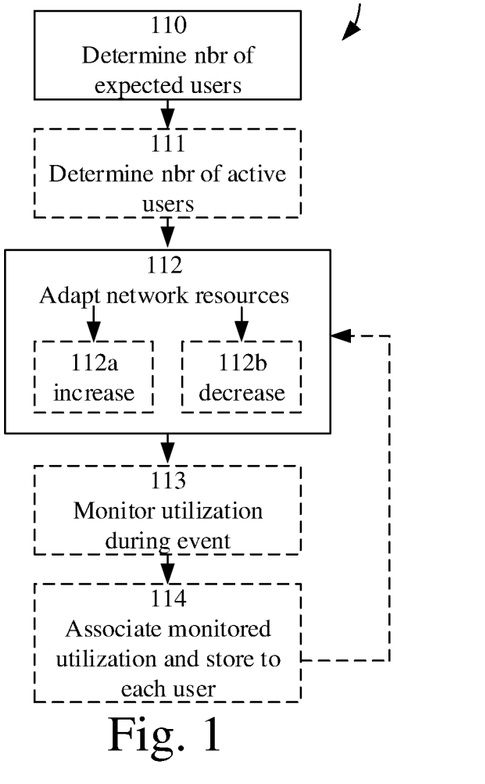
FIG. 1 is a flowchart illustrating example method steps according to some embodiments.

FIG. 1 illustrates an example method 100 according to some embodiments for managing network resources of a communication network. The method 100 start in step 110 with determining a number of expected users to be physically present at a planned event, wherein the expected users are associated with a network operator.

In some embodiments, the planned event may e.g. be a physical event associated with a geographical location being under coverage of the communication network. The planned event may e.g. be a concert, sports event, demonstration, market or any other type of happening that is expected to draw a crowd. The planned event may further be held at a physical location that is being covered by one or more network nodes providing network coverage, which network will typically be utilized by the crowd attending the event.

When referring to users herein it is meant to refer to e.g. subscribers that are associated with a network operator. A user may hence be a physical person having access to a communication device that utilize the network provided by the network operator.

The method 100 may then continue in step 112 with adapting an amount of available network resources for the network operator in conjunction with the planned event based on the number of expected users.

As illustrated in step 112a and 112b network resources may be scheduled to be either increased (step 112a) or decreased (step 112b) based on the expected utilization during the event.

E.g. if the network utilisation is expected to be substantial (e.g. because many users are expected to be present with their communication devices with them) then the network resources may be scheduled to be increased. Increase of network resources may e.g. be realized by requesting additional resources from the network, performing network slicing, performing edge computing at the event, reserve bandwidth for the particular event or any other known conventional method for increasing the amount of available network resources.

If the number of expected users are low on the other hand, it may be determined that the regular amount of available network resources are more than enough to support the users during the event. The operator may hence determine that available network resources may be decreased in order to provide for economic network resource utilisation while still avoiding congestion.

In order to provide a more granular estimation of needed network resources for the planned event, the method 100 may also comprise optional step 111 further comprising determining, for each of the expected users, whether the expected user is an active user and adapting the amount of available network resources in conjunction with the planned event based on a number of active users of the expected users associated with the network operator.

An active user may e.g. be a user that is verified to exist and is active in a network. I.e. the physical person has its communication device turned on and regularly utilizes it in the network provided by the operator.

If a user is determined to be active, its usage pattern may be taken into consideration for when adapting the available network resources since it is likely that the communication device of the user will be present at the event.

If the user is determined to be not active (the user may e.g. have entered the wrong credentials when registering to the planned event, see below, or it has simply been turned off for a long time) that particular user may not have to be taken into consideration when adapting the available network resources.

In some embodiments, in order to in step 110 be able to determine the number of expected users, the method may comprise that the expected users have registered to the planned event prior to the planned event through a registration portal associated with the planned event. Hence determining the number of expected users may comprise acquiring the number of expected users from the registration portal.

Furthermore, in some embodiments, adapting the amount of available network resources may comprise obtaining a respective user profile for each of the expected users, wherein the respective user profile comprises information pertaining to historical and/or current data usage for the expected user, and adapting the amount of available network resources based on the historical and/or current data usage for the expected users.

By accessing information pertaining to each of the expected users associated with network operator, the network resources may be adapted based on past and/or present usage pattern for each user. E.g. if a majority of the expected users have a user profile that indicate that they are prone to utilize their connected communication device excessively, more network resources than originally intended may be scheduled for the network operator during the planned event.

In some embodiments, the respective user profile may further comprise information pertaining to historical and/or current data usage in conjunction with one or more other events being of a same or similar type as the planned event for the expected user.

If e.g. the planned event is a football game, the user profile may comprise information associated with network utilization of the user when the user has attended other football games and/or other sports event.

In some embodiments, adapting the amount of available network resources may further be based on one or more of: a location of the planned event, timings associated with the planned event, an event type, a current network load, and a historical network load.

The location of the event may e.g. affect the network utilization based on if it's a closed location such as building or arena, or if it's an open location, such as a field or a park. In an open location it may be assumed that users which are not registered to the event may still be catered by the network, whereas in a closed location it may be determined that the users that have registered to the event are the only ones that will utilize the network resources, or that very few other users that have not registered will be present (such as e.g. staff at the location, artists, players, extras etc.).

In the same manner, timings of the planned event may be taken into consideration, e.g. if the event is scheduled to take place in day time or night time. This in combination with e.g. the location parameters of the event may lead to an increase or decrease in network resources planned for scheduling. An open location in day time may e.g. attract more users than an open location at night time.

In some embodiments, the timings of the event may also be used for knowing when additional or less network resources typically needs to be scheduled.

In some embodiments, information of the planned event and information associated with the user profiles may be inputs in a predictive model used for determining an expected amount of network resources needed during the planned event. A predictive model according to some embodiments will be described in more detail in conjunction with FIG. 3.

In some embodiments, the method 100 may further continue in optional step 113 comprising monitoring an actual data usage of each of the expected users during the planned event. The method may then continue in optional step 114 with associating and storing the monitored utilization to each user by storing information pertaining to the actual data usage for each expected user.

The information may e.g. be added to the user profile of the user.

In some embodiments, the method 100 may loop back to step 112, where the stored information pertaining to the actual data usage for each expected user is used when adapting available network resources for at least one future event.

In some embodiments, the method 100 may further comprise determining a total number of users expected to utilize network resources in conjunction with the planned event, wherein the total number of users comprises the number of expected users and other users associated with at least one other network operator.

The method 100 has been described in general terms, and could be performed e.g. by standard entities within e.g. a 5G network as will be described in conjunction with FIG. 2.

Figure 2:
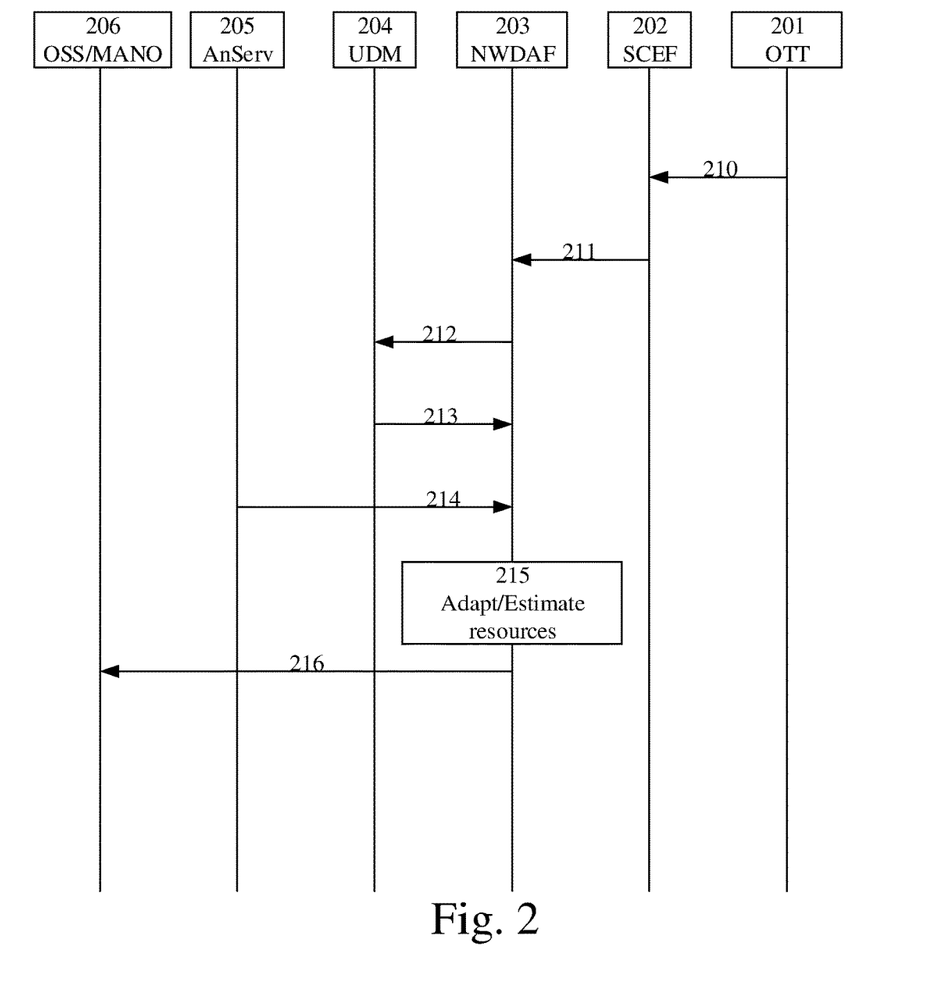
FIG. 2 is a signaling diagram illustrating communication according to some embodiments.

FIG. 2 illustrates a signalling diagram between network entities in a 5G network topology.

The signalling diagram depicts the messages that flow between the network functions/entities shown in FIG. 2 i.e. Over The Top (OTT) server 201, Service Capability Exposure Function (SCEF) 202, Network Data Analytics Funtion (NWDAF) 203, Unified Data Management (UDM) 204, Analytical Server (AnServ) 205 and Operation Support System (OSS)/Management and Orchestration (MANO) 206 and may e.g. illustrate the message/signalling flow carried out when performing the method 100 as described in conjunction with FIG. 1.

UDM 204, NWDAF 203, and SCEF 202 are standard network functions in the proposed 5G network architecture.

OTT server 201 may correspond to a server belonging to an over the top player that might be involved in the scheduling of the planned event. For example, the OTT server 201 may correspond to a web server that facilitates for the users/subscribers to attend/register for the said event through a web-portal.

Analytical server 205 may correspond to a server that may interact with different network functions in the 5G network in order to fetch historical data associated with the users and historical data about the network resource utilization in the network. OSS/MANO 206 may correspond to a management and orchestrating system that may be used to instantiate network resources (compute, network, storage, radio resources etc.) in the 5G network at pre-defined network functions.

At step 210, the OTT server 201 transmits the information about a planned event which is going to take place at a predetermined location. In a 5G network deployment, the OTT server 201 may transmit this information to the network function SCEF 202. The event may correspond to various social groupings e.g. musical concerts, sports matches, movies, conferences, exhibitions, and the like.

Thus, the OTT server 201 may host the registration portal and the expected users have registered to the planned event prior to the planned event through the registration portal associated with the planned event, and determining the number of expected users comprises acquiring the number of expected users from the registration portal (compare with step 110 of the method 100).

The planned event may e.g. be the planned event as described in conjunction with FIG. 1. Since users have registered/scheduled for the event through the OTT server 201, it will have information about the users attending the planned event at said location.

In some embodiments, the OTT server 201 may then transmit the below information to the SCEF 202:
Subscriber list—e.g. list of MSISDNs associated with the network service provider/network operator (the terms network service provider and network operator may be used interchangeably in this disclosure);
Event Location—e.g. represented by L;
Event Type—e.g. represented by T;
Event Timing—e.g. start time (t1) and end time (t2) of the event;
The OTT server 201 may transmit above information to the SCEF 202 over interfaces that are already known in the art (e.g. through REST API).

It should be noted that OTT server 201 may determine the users/subscribers associated with the network service provider/network operator (out of the total amount of users who registered for the event) based on conventionally known methods. For example, if the OTT server 201 has the information about a thousand users are attending the event (based on registrations to the event), the OTT server 201 may determine that only four hundred users are subscribers belonging to the network service provider/network operator associated with FIG. 2 (i.e. the network operator that both provides network function as well as serves the expected users), e.g. by accessing the MSISDN of the users.

In another embodiment, the OTT server may transmit the information about all the users (i.e. including subscribers belonging to other network service providers) based on e.g. the non-disclosure-agreement (NDA) between the OTT player and the network service provider, without deviating from the embodiments disclosed herein.

The SCEF 202 may then, based on the received information, determine a number of expected users to be physically present at a planned event, wherein the expected users are associated with a network operator (compare with step 110 of method 100). The SCEF 202 may e.g. check which users out of the total amount of users that belong the network operator by checking the MSISDN of the users and compare it to a data base hosted by the operator comprising its subscribers (e.g. the UDM, see further below).

In some embodiments, the OTT server 201 may determine a number of expected users to be physically present at a planned event, wherein the expected users are associated with a network operator (compare with step 110 of the method 100).

At step 211, the SCEF 202 may transmit the subscription information (e.g. 400 MSISDNs associated with the network service provider) received from the OTT server 201 to the network function NWDAF 203. Hence, the network function SCEF 202 may in some embodiments just facilitate the exposure of the network function NWDAF 203 towards the external non-trusted domain (i.e. the OTT server 201).

At step 212, the NWDAF 203 contacts the UDM 204 for identifying the subscribers that are currently active (compare with step 111 of the method 100). It will be understood that knowing the activations status may be advantageous in order to determine the actual existence of provided subscriptions in the network provider's database (i.e. the UDM 204). The NWDAF may e.g. inform the UDM of all of the expected users/subscribers associated with the network operator and to be present at the planned event.

At step 213 UDM 204 may provide an activation status for the each of the subscribers received from the NWDAF 203. Since the UDM 204 includes the database of all the subscribers belonging to the network service provider, it may determine the activation status of the subscribers and provide this information to the NWDAF. Based on this information, the NWDAF may determine the subscribers that are active in the home network and are expected to be present in the location for the planned event (compare with step 111 of the method 100).

For example, continuing to the previous example, if out of four hundred subscribers belonging to the network service provider, fifty subscribers are disconnected from the time they registered for the event (or, let's say, they provided wrong information during the registration), then the UDM provides the information to NWDAF that only three hundred and fifty subscribers (out of the provided four hundred subscribers) are actually active in the network.

At step 214, for managing network resources by adapting an amount of available network resources for the network operator in conjunction with the planned event based on the number of expected users (compare with step 112 of the method 100), the NWDAF 203 may request the analytical server 205 to provide the usage-pattern associated with the filtered set of subscribers (i.e. 350 (active) subscribers belonging to the network service provider in the above example). In addition, NWDAF may also request the analytical server 205 to provide historical information about the network resource utilization (e.g. from the Session Management Function (SMF) that covers the area of event location). The SMF is not depicted in FIG. 2 for sake of simplicity, but is also a general function of a 5G architecture.

Hence the NWDAF may obtain a respective user profile from the analytical server for each of the expected users, wherein the respective user profile comprises information pertaining to historical and/or current data usage for the expected user, and adapting the amount of available network resources based on the historical and/or current data usage for the expected users.

As discussed, the analytical server may correspond to any analytical server that maintains information related to usage-pattern associated with the subscribers in the network and the historical information about the network resource utilization. Usage-pattern for the subscribers may be determined based on historical data associated with the subscribers. For example, the analytical server may communicate with the network function SMF to fetch information related to data usage by the subscribers and hence form a user profile for each user comprising its resource usage pattern. Thus, the analytical server may provide the information about type of services used (e.g. video streaming, virtual reality gaming, video conference etc.), duration of the sessions for which services was used, data download during services usage and the like.

Hence in some embodiments the user profile may further comprise information pertaining to historical and/or current data usage in conjunction with one or more other events being of a same or similar type as the planned event for the expected user.

Similarly, the analytical server may provide the installed network resources and their utilization to the NWDAF 203, wherein the installed network resources and their utilization is for the location of the planned event.

It will be understood that, as per current 3GPP specifications (e.g. referring 3GPP specification 23.501), the NWDAF is suggested to provide load related information about network slices to the requesting network functions (e.g. Policy Control Function, PCF). Thus, it is proposed by the embodiments provided herein to e.g. enrich the functionalities of the NWDAF to cater to such general analytics also, as described above.

In another embodiment, instead of the NWDAF 203, a separate network function (not depicted in FIG. 2) may fetch this historical information about usage pattern (i.e. the user profile) associated with the subscribers from the analytical server. The separate function may e.g. be other network function in a proposed 5G network, or it may be a new network function that may have been developed specifically for this purpose. It may be separate from the NWDAF or a part of the NWDAF.

In further embodiment, the NWDAF (or the separate network function) may construct/obtain the user profile for each user by fetching the historical information directly from other network functions (e.g. data usage pattern from SMF, over Network Slice Management Function, NSMF, interface) instead of getting this information from the analytical server.

At step 215, the NWDAF may estimate a requirement for additional network resources based on the received information (compare with step 112 of the method 100). It should be understood that the historical information about the usage-pattern at the event location and between the start and end timings of the event can be extracted from the information provided by the analytical server (or provided by other functions such as SMF, NSMF). NWDAF may utilize this information along with the information about current and historical information about network utilization to estimate the requirement of additional network resources at the location at said timings and for said event type.

For such estimation, predictive models that are commonly known may be used. The predictive models will take different kinds of input (e.g. usage-pattern, timings, location, event type, historical network load, current network load etc.) to predict the requirement of additional network resources. Different examples of a predictive model can be machine learning algorithms, artificial intelligence algorithms, curve-fitting for extrapolation of data etc.

Figure 3:
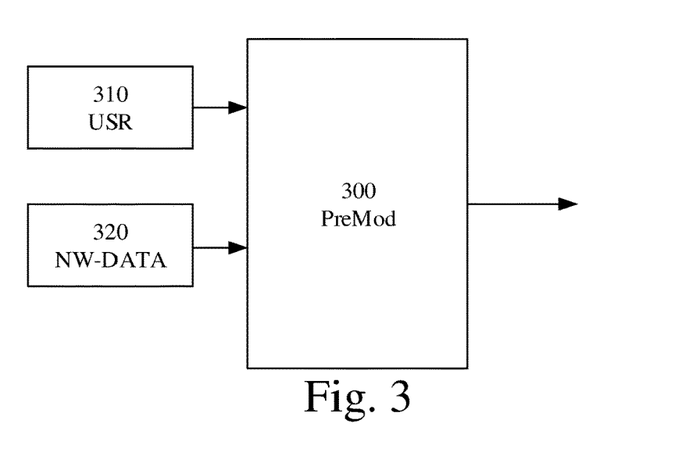
FIG. 3 is a schematic drawing of a predictive model according to some embodiments.

FIG. 3 is e.g. a schematic drawing of a predictive model (PreMod) 300 receiving user related input (USR) 310 and network related input (NW-DATA) 320 to estimate/determine/calculate an expected network load during the planned event such that the network operator may instruct the network to schedule additional, or an decreased amount of, resources for the operator's subscribers during/for the planned event. The predictive model 300 may e.g. in some embodiments form part of the method 100 or signalling diagram as described in conjunction with FIG. 1 and FIG. 2 respectively.

User related input may e.g. be information pertaining to the user profiles. Network related input may e.g. be information pertaining to the location of the event, or other network related parameters such signal quality, level of congestions, coverage etc.

Hence, the NWDAF may determine additional network resource requirements (e.g. in the terms of computations, storage, network, or radio resource requirements) that are expected to be additionally required at the event location due to estimated resource usage by the subscribers attending the planned event.

Returning to FIG. 2, at step 216, the NWDAF may schedule the deployment of these additional resource requirements (i.e. increase or decrease of scheduled network resources for the operator in conjunction with the planned event). For example, the NWDAF may schedule the deployment through an Operation Support System (OSS) node or through some cloud orchestrator node. Such orchestrators may ensure the instantiation of the scheduled computations, storage, network, or radio resources using methods known in the art.

Hence, the NWDAF may, in some embodiments, adapt an amount of available network resources for the network operator in conjunction with the planned event based on the number of expected users.

In some embodiments, the NWDAF may further adapt the amount of available network resources based on one or more of: a location of the planned event, timings associated with the planned event, an event type, a current network load, and a historical network load.

In some embodiments, the NWDAF may adapt the amount of available network resources in conjunction with the planned event based on the number of active users of the expected users associated with the network operator.

In some embodiments, the NWDAF may further monitoring an actual data usage of each of the expected users during the planned event, store information pertaining to the actual data usage for each expected user and use the stored information pertaining to the actual data usage for each expected user when adapting available network resources for at least one future event.

The NWDAF may e.g. relay to the analytical server the actual resource utilization during the event, and the analytical server may store this information in association to each respective user in its respective user profile.

Figure 4:
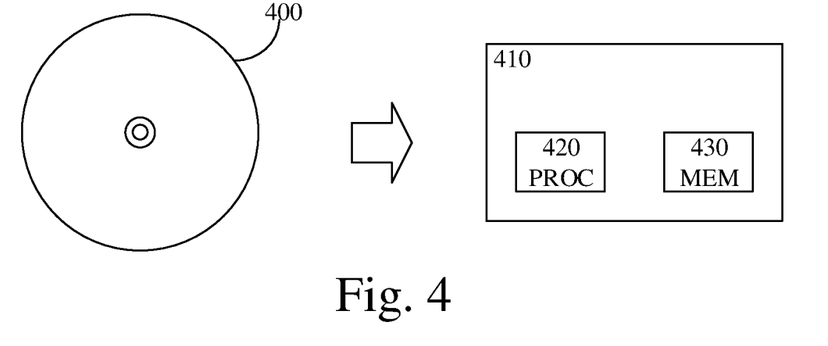
FIG. 4 is a block diagram illustrating an example computer program product according to some embodiments.

FIG. 4 illustrates a computer program product comprising a non-transitory computer readable medium 400. The non-transitory computer readable medium has stored there on a computer program comprising program instructions. The computer program is configured to be loadable into a data-processing unit 410, comprising a processor 420 and a memory 430 associated with or integral to the data-processing unit 410. When loaded into the data-processing unit 410, the computer program is configured to be stored in the memory 430, wherein the computer program, when loaded into and run by the processor 420 is configured to cause the processor 420 to execute method steps according to any of the methods described in conjunction with any of the FIGS. 1-3.

Figure 5:
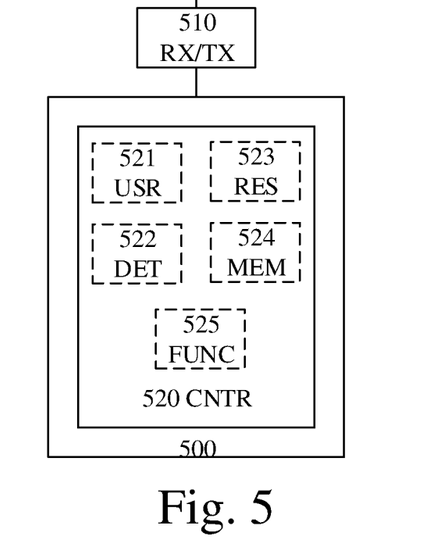
FIG. 5 is a block diagram illustrating an apparatus according to some embodiments.

FIG. 5 illustrates an apparatus 500 according to some embodiments.

The apparatus (500) may be for managing network resources of a communication network. The apparatus comprises controlling circuitry (CNTR) 520 configured to cause determination of a number of expected users to be physically present at a planned event, wherein the expected users are associated with a network operator, and adaptation of an amount of available network resources for the network operator in conjunction with the planned event based on the number of expected users.

The apparatus 500 may e.g. be a network node operating in a wireless communication network. The apparatus may e.g. be a base station, a computer, a communication device, a remote server, a cloud implementation etc.

In some embodiments, the apparatus 500 may be, or be comprised in a, control node.

The apparatus 500 may be associated with a network operator and/or configured to communicate with or comprise network functions (FUNC) 525 such as one or more of UDM, NWDAF, SCEF, AnSery and OSS/MANO.

In some embodiments, the apparatus 500 is configured to operate in a 5G network environment.

In some embodiments, the apparatus 500 is configured to operate in at least one of a 2G, 3G, 4G and 5G environment.

In some embodiments, the apparatus 500 is configured to carry out any of the methods, signalling, and predictive models as described in conjunction with any of FIGS. 1-3.

To this end, the controlling circuitry 520 may comprise a user circuit (USR) 521 for causing the USR to determine a number of expected users to be present at a planned event. The USR (or the controlling circuitry 520) may e.g. cause an antenna arrangement (RX/TX) 510 comprised or associated with the apparatus 500 to receive a user/subscriber list from an external server, such as a OTT-external server. The USR 521 may then cause determination of the expected users based on the received user list. In some embodiments, the USR 521 may be configured to cause retrieval of the users expected to be present at the planned the event without the assistance of an external OTT-server.

To this end, the controlling circuitry may also comprise a determiner (DET) 522 configured to cause determination of the number of expected users (e.g. by causing the USR 521).

In some embodiments, the planned event is a physical event associated with a geographical location being under coverage of the communication network. The apparatus may e.g. in some embodiments be physically deployed in the vicinity of the planned event, or may be deployed physically or non-physically at a remote location.

In some embodiments, the controlling circuitry (520) is further configured to cause adaptation of the amount of available network resources by causing obtainment of a respective user profile for each of the expected users. The respective user profile may comprise information pertaining to historical and/or current data usage for the expected user. The controlling circuitry 520 may further be configured to cause adaptation of the amount of available network resources based on the historical and/or current data usage for the expected users.

The controlling circuitry 521 may e.g. be configured to cause the USR 521 to retrieve the respective user profiles according to any of the examples listed above for forming/retrieving/obtaining the user profile.

To this end, the controlling circuitry 521 may comprise a resource manager (RES) 523 and may further be configured to cause the RES 523 to adapt scheduled network resources for the operator based on the number of expected users and their respective user pattern derived from their respective user profile.

In some embodiments, the respective user profile further comprises information pertaining to historical and/or current data usage in conjunction with one or more other events being of a same or similar type as the planned event for the expected user.

The event may e.g. be a sports event, a concert, a planned demonstration or similar. In some embodiments, the planned event is a holiday such as New Year's Eve, when it is expected that a multitude of users will utilize the network at the same time (e.g. at midnight).

In some embodiments, the controlling circuitry 520 is configured to cause adaptation of the amount of available network resources based on one or more of: a location of the planned event, timings associated with the planned event, an event type, a current network load, and a historical network load.

The controlling circuitry may e.g. cause the RES 523 to adapt the amount of available network resources based on one or more of: a location of the planned event, timings associated with the planned event, an event type, a current network load, and a historical network load.

In some embodiments, the expected users have registered to the planned event prior to the planned event through a registration portal associated with the planned event. The controlling circuitry 520 may be configured to cause determination of the number of expected users by causing acquirement of the number of expected users from the registration portal.

The registration portal may be hosted on the web, e.g. by the apparatus 500, or by an external server, such as an OTT-server (compare with FIG. 2). The registration portal may be associated with the planned event and may comprise a plurality of other events to which users may register. The registration portal may be associated with the network operator, and with other network operators. It may hence be part of a service provided by the network operator for ensuring good network performance to its user wherever they are or whenever they need it.

In some embodiments, the controlling circuitry (520) is further configured to cause determination, for each of the expected users, of whether the expected user is an active user and adapting the amount of available network resources in conjunction with the planned event based on a number of active users of the expected users associated with the network operator.

The controlling circuitry 521 may e.g. cause the USR 521 and/or the DET 522 to cause determination of the number of active users according to any of the examples described above for determining active users.

In some embodiments, the controlling circuitry 520 is further configured to cause monitoring of an actual data usage of each of the expected users during the planned event, storing of information pertaining to the actual data usage for each expected user and usage of the stored information pertaining to the actual data usage for each expected user when adapting available network resources for at least one future event.

To this end, the controlling circuitry 520 may further comprise a memory (MEM) 524 for storing information pertaining to actual data usage for each expected user. The controlling circuitry 520 may further be configured to associate the actual data usage with each expected user by causing addition of it to the user profile of each expected user.

In some embodiments, the controlling circuitry 520 is further configured to cause determination of a total number of users expected to utilize network resources in conjunction with the planned event, wherein the total number of users comprises the number of expected users and other users associated with at least one other network operator.

The controlling circuitry 520 may e.g. cause USR 521 or DET 522 to determine the number of total users. E.g. through any of the embodiments described above for determining a number of expected users.

The USR may e.g. obtain all users that have registered to the planned event through the registration portal, regardless of the operator to which the users are associated.

It may be beneficial to have knowledge of all present users associated with a certain network operator in order to determine expected congestion of the network supplied at the planned event and further base the amount of network resources needed on this.

According to some embodiments herein, a usage profile of the subscribers visiting a particular location for a particular event is considered in order to estimate the additional network resources required due to usage from those subscribers. In an embodiment of 5G network deployment, information about the scheduled availability of the subscribers at the location may typically be obtained by a network function SCEF from an external OTT service provider. Based on the received information, the SCEF filters down the subscribers associated with its own network and then transmits the information about filtered set of subscribers to a NWDAF. Subsequently, the NWDAF fetches the usage-profile of those filtered set of subscribers (e.g. based on historical usage pattern for those subscribers) from other network functions in the network. Based on the usage-profile of those subscribers, along with the historical and current information about network resource utilization, the NWDAF may determine the additional network resources required due to visiting subscribers. Based on this available information, network resources are scheduled (e.g. through OSS) to be added or removed at the said location to avoid network congestion but also ensuring economic resource allocation during the subscribers' attendance to the planned event and event location.

The embodiments described herein enables for a granular determination and estimation of network resource utilisation.

The embodiments herein enables proactive resource adaption on a granularity level associated with the network operator and a given point of time and place, such as at a planned event.

Hence network resources may be adapted with a large accuracy and may thus contribute to less risk of network congestion during the actual event.

The embodiments herein have been mainly described for a 5G network scenario, however the embodiments herein are not limited to 5G. Other known network types are also applicable since they comprise corresponding network functions as those described herein for e.g. keeping track on user pattern and number of users associated with a network operator.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a base station, a base station controller, a pager, a communicator, an electronic organizer, a smartphone, a computer, a notebook, a USB-stick, a plug-in card, an embedded drive, or a mobile gaming device.

Figure 6:
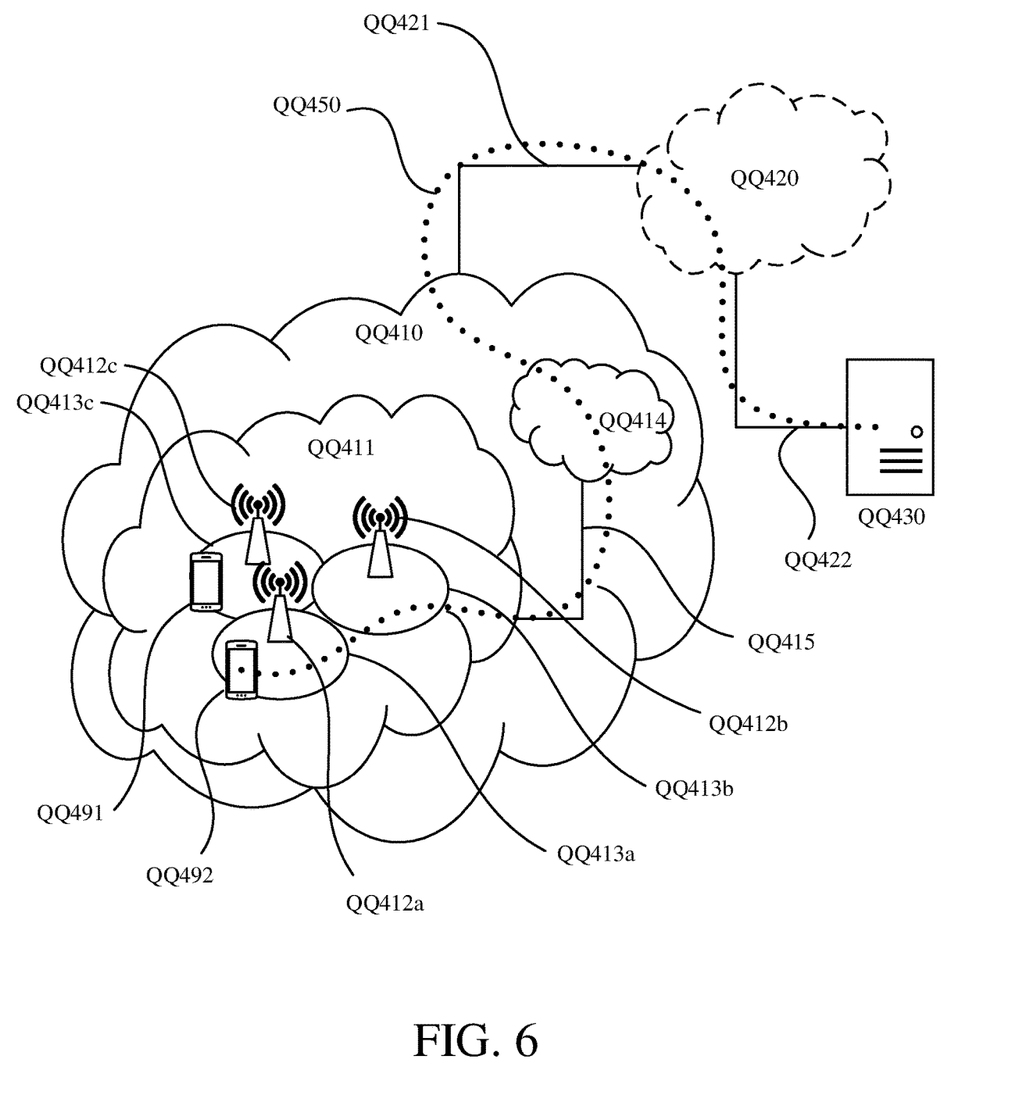
FIG. 6 illustrates a telecommunication network connected via an intermediate network to a host computer in accordance with some embodiments.

According to some embodiments, a computer program product comprises a computer readable medium such as, for example, a diskette or a CD-ROM. The computer readable medium may have stored thereon a computer program comprising program instructions. The computer program may be loadable into a data-processing unit, which may for example be comprised in a mobile terminal. When loaded into the data-processing unit, the computer program may be stored in a memory associated with or integral to the data-processing unit. With reference to FIG. 6, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412*a*, QQ412*b*, QQ412*c*, such as NBs, eNBs, gNBs or other types of wireless access points, each defining a corresponding coverage area QQ413*a*, QQ413*b*, QQ413*c*. Each base station QQ412*a*, QQ412*b*, QQ412*c* is connectable to core network QQ414 over a wired or wireless connection QQ415. A first UE QQ491 located in coverage area QQ413*c* is configured to wirelessly connect to, or be paged by, the corresponding base station QQ412*c*. A second UE QQ492 in coverage area QQ413*a* is wirelessly connectable to the corresponding base station QQ412*a*. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 6 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 7. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 7) served by base station QQ520. Communication interface QQ526 may be configured to facilitate connection QQ560 to host computer QQ510. Connection QQ560 may be direct or it may pass through a core network (not shown in FIG. 7) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 7:
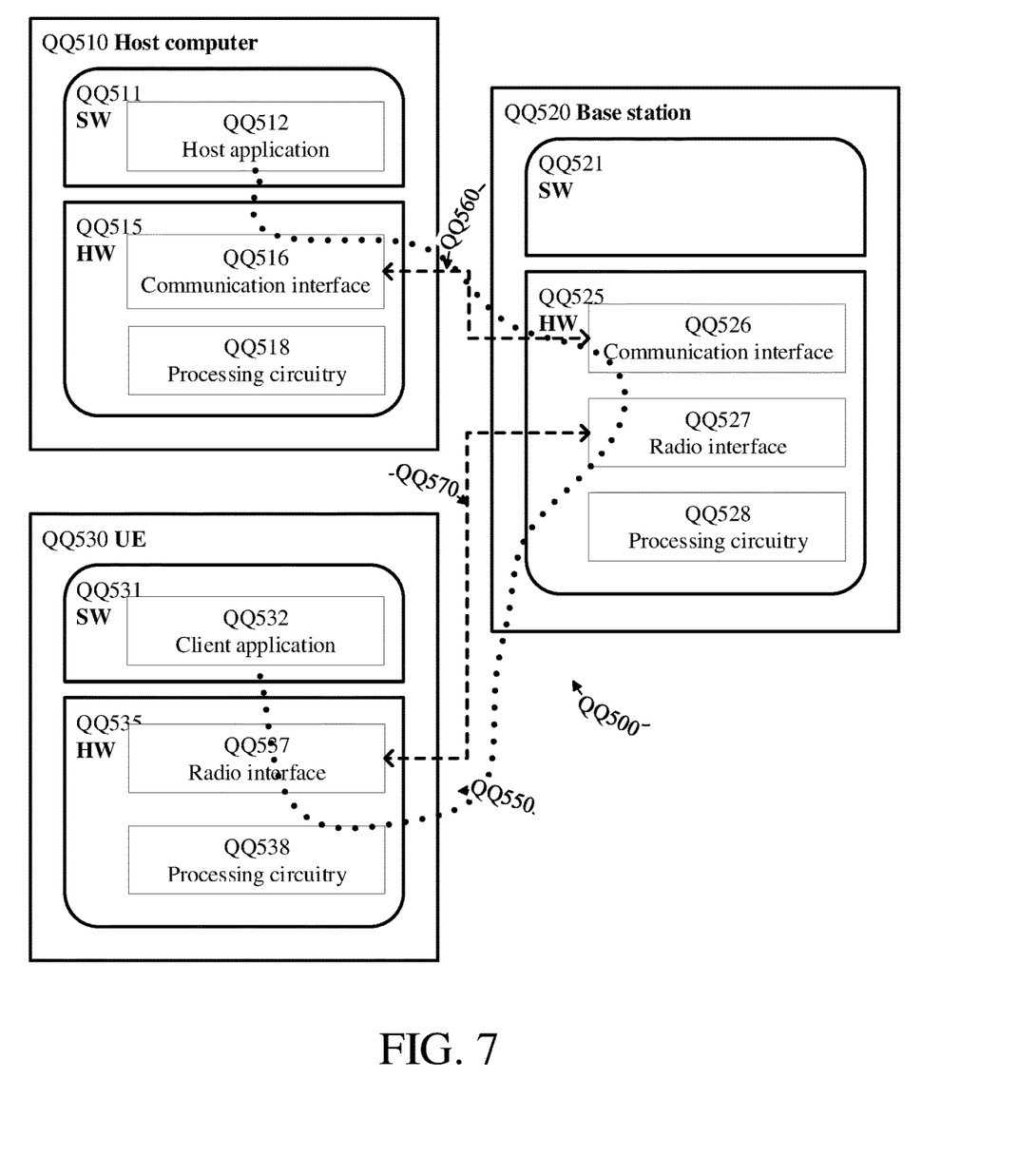
FIG. 7 illustrates a host computer communicating via a base station with a user equipment over a partially wireless connection in accordance with some embodiments.

It is noted that host computer QQ510, base station QQ520 and UE QQ530 illustrated in FIG. 7 may be similar or identical to host computer QQ430, one of base stations QQ412a, QQ412b, QQ412c and one of UEs QQ491, QQ492 of FIG. 6, respectively. This is to say, the inner workings of these entities may be as shown in FIG. 7 and independently, the surrounding network topology may be that of FIG. 6.

In FIG. 7, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the channel sensing and thereby provide benefits such as better resolving of collisions.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 8:
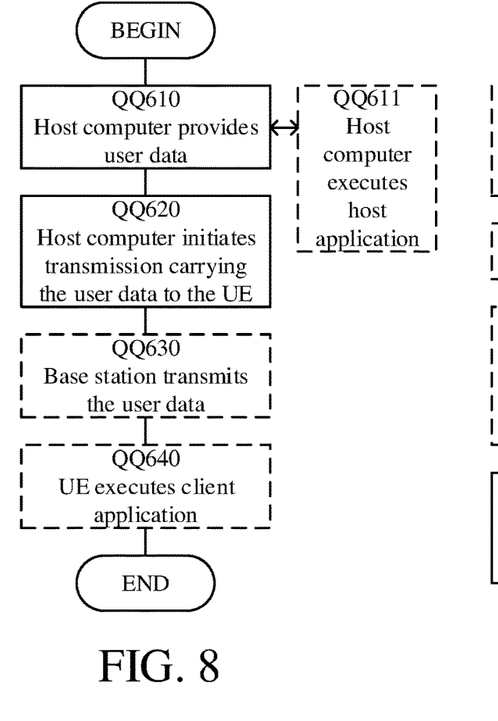
FIG. 8 is a flowchart illustrating example method steps implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 9:
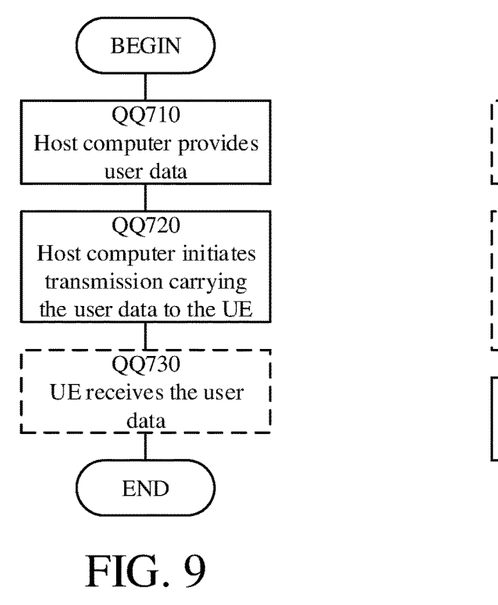
FIG. 9 is a flowchart illustrating example method steps implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 10:
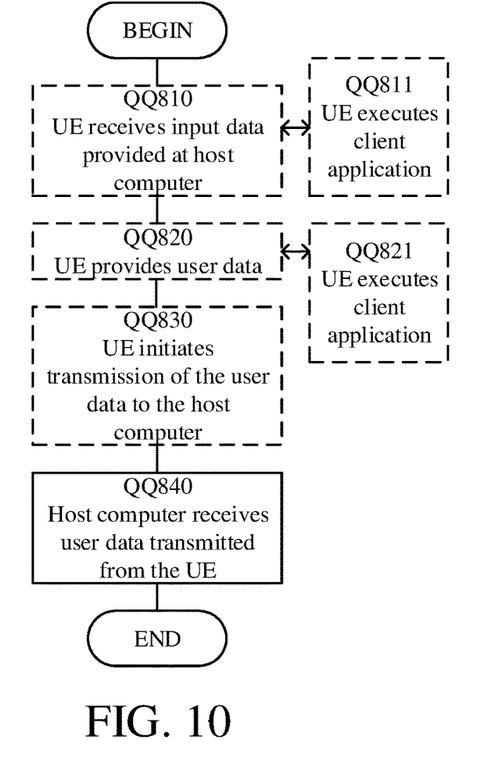
FIG. 10 is a flowchart illustrating example method steps implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 11:
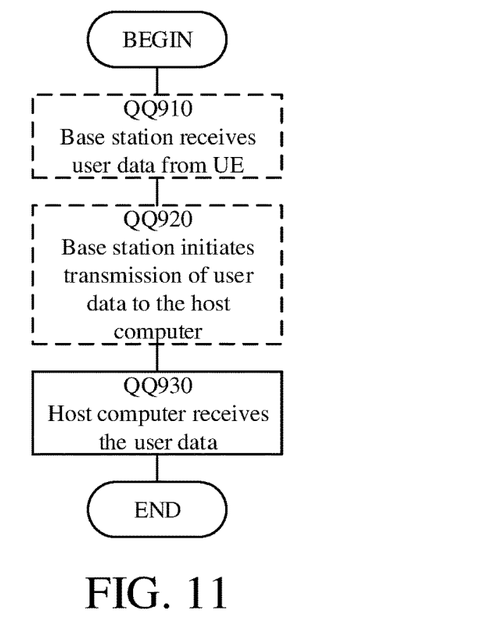
FIG. 11 is a flowchart illustrating example method steps implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely for illustrative purpose and by no means limiting. Instead, all variations that fall within the range of the claims are intended to be embraced therein.

Example Embodiments

Group A Embodiments

A1. A method for managing network resources of a communication network performed by a wireless device, the method comprising:

determining (110) a number of expected users to be physically present at a planned event, wherein the expected users are associated with a network operator; and adapting (112, 215) an amount of available network resources for the network operator in conjunction with the planned event based on the number of expected users A2. The method of any of the previous embodiments in Group A, further comprising:
providing user data; and
forwarding the user data to a host computer via transmission to a base station.

Group B Embodiments

B1. A method for managing network resources of a communication network performed by a base station, the method comprising:
determining (110) a number of expected users to be physically present at a planned event, wherein the expected users are associated with a network operator; and
adapting (112, 215) an amount of available network resources for the network operator in conjunction with the planned event based on the number of expected users B2. The method of any of the previous embodiments in Group B, further comprising:
obtaining user data; and
forwarding the user data to a host computer or a wireless device.

Group C Embodiments

C1. A wireless device for managing network resources of a communication network the wireless device comprising a plurality of transceiver antenna elements and being configured to operate in a communication network, the wireless device further comprising:
processing circuitry configured to perform any of the steps of any of the Group A embodiments; and
power supply circuitry configured to supply power to the wireless device.

C2. A base station for managing network resources of a communication network, the base station comprising a plurality of transceiver antenna elements and being configured to operate in a communication network, the base station further comprising:
processing circuitry configured to perform any of the steps of any of the Group B embodiments;
power supply circuitry configured to supply power to the base station.

C3. A user equipment (UE) for managing network resources of a communication network, the UE comprising a plurality of transceiver antenna elements and being configured to operate in a communication network, the UE further comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;

an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps described for the Group B embodiments.

D2. The communication system of embodiment D1 further including the base station.

D3. The communication system of any of embodiments D1 through D2, further including the UE, wherein the UE is configured to communicate with the base station.

D4. The communication system of any of embodiments D1 through D3, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps described for the Group B embodiments.

D6. The method of embodiment D5, further comprising, at the base station, transmitting the user data.

D7. The method of any of embodiments D5 through D6, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform the method of any of embodiments D5 through D7.

D9. A communication system including a host computer comprising:
processing circuitry configured to provide user data; and
a communication interface configured to forward user data to a cellular network for transmission to a user equipment (UE), wherein the UE comprises a radio interface and processing circuitry, the UE's components configured to perform any of the steps described for the Group A embodiments.

D10. The communication system of embodiment D9, wherein the cellular network further includes a base station configured to communicate with the UE.

D11. The communication system of any of embodiments D9 through D10, wherein:
the processing circuitry of the host computer is configured to execute a host application, thereby providing the user data; and
the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps described for the Group A embodiments.

D13. The method of embodiment D12, further comprising at the UE, receiving the user data from the base station.

D14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps described for the Group A embodiments.

D15. The communication system of embodiment D14, further including the UE.

D16. The communication system of any of embodiments D14 through D15, further including the base station, wherein the base station comprises a radio interface configured to communicate with the UE and a communication interface configured to forward to the host computer the user data carried by a transmission from the UE to the base station.

D17. The communication system of any of embodiments D14 through D16, wherein:
the processing circuitry of the host computer is configured to execute a host application; and
the UE's processing circuitry is configured to execute a client application associated with the host application, thereby providing the user data.

D18. The communication system of any of embodiments D14 through D17, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps described for the Group A embodiments.

D20. The method of embodiment D19, further comprising, at the UE, providing the user data to the base station.

D21. The method of any of embodiments D19 through D20, further comprising:
at the UE, executing a client application, thereby providing the user data to be transmitted; and
at the host computer, executing a host application associated with the client application.

D22. The method of any of embodiments D19 through D21, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A user equipment (UE) configured to communicate with a base station, the UE comprising a radio interface and processing circuitry configured to perform the method of any of embodiments D19 through D22.

D24. A communication system including a host computer comprising a communication interface configured to receive user data originating from a transmission from a user equipment (UE) to a base station, wherein the base station comprises a radio interface and processing circuitry, the base station's processing circuitry configured to perform any of the steps described for the Group B embodiments.

D25. The communication system of embodiment D24 further including the base station.

D26. The communication system of any of embodiments D24 through D25, further including the UE, wherein the UE is configured to communicate with the base station.

D27. The communication system of any of embodiments D24 through D25, wherein:
the processing circuitry of the host computer is configured to execute a host application;
the UE is configured to execute a client application associated with the host application, thereby providing the user data to be received by the host computer.

D28. A method implemented in a communication system including a host computer, a base station and a user equipment (UE), the method comprising:
at the host computer, receiving, from the base station, user data originating from a transmission which the base station has received from the UE, wherein the UE performs any of the steps described for the Group A embodiments.

D29. The method of embodiment D28, further comprising at the base station, receiving the user data from the UE.

D30. The method of any of embodiments D28 through D29, further comprising at the base station, initiating a transmission of the received user data to the host computer.

D31. A method implemented in a communication system including a host computer, a base station and a user equipment (UE), the method comprising:
at the host computer, receiving, from the base station, user data originating from a transmission which the base station has received from the UE, wherein the base station performs any of the steps described for the Group B embodiments.

D32. The method of embodiment D31, further comprising at the base station, receiving the user data from the UE.

D33. The method of any of embodiments D31 through D32, further comprising at the base station, initiating a transmission of the received user data to the host computer.

The invention claimed is:

1. A method for managing network resources of a communication network, the method comprising:
   determining a number of expected users to be physically present at a planned event, the expected users being associated with a network operator;
   increasing an amount of available network resources for the network operator in conjunction with the planned event based on the number of expected users and at least one of historical data or current data usage for the expected users, the increasing of the amount of available network resources including obtaining a respective user profile for each of the expected users, the respective user profile including information pertaining to at least one of the historical data or the current data usage for the expected user;
   monitoring an actual data usage of each of the expected users during the planned event;
   storing information pertaining to the actual data usage for each expected user; and
   using the stored information pertaining to the actual data usage for each expected user when adapting available network resources for at least one future event.

2. The method according to claim 1, wherein the planned event is a physical event associated with a geographical location being under coverage of the communication network.

3. The method according to claim 1, wherein the respective user profile further comprises information pertaining to at least one of the historical and the data usage in conjunction with one or more other events being one of a same and a same type as the planned event for the expected user.

4. The method according to claim 1, wherein increasing the amount of available network resources is further based on one or more of: a location of the planned event, timings associated with the planned event, an event type, a current network load, and a historical network load.

5. The method according to claim 1, wherein the expected users have registered to the planned event prior to the planned event through a registration portal associated with the planned event, and wherein determining the number of expected users comprises acquiring the number of expected users from the registration portal.

6. The method according to claim 1, further comprising:
   determining for each of the expected users whether the expected user is an active user and adapting the amount of available network resources in conjunction with the planned event based on a number of active users of the expected users associated with the network operator.

7. The method according to claim 1, further comprising: determining a total number of users expected to utilize network resources in conjunction with the planned event, wherein the total number of users comprises the number of expected users and other users associated with at least one other network operator.

8. A non-transitory computer storage medium storing a computer program comprising program instructions that, when loaded into and run by a processor, cause the processor to execute method, the method comprising:
   determining number of expected users to be physically present at a planned event, the expected users being associated with a network operator;
   increasing an amount of available network resources for the network operator in conjunction with the planned event based on the number of expected users and at least one of historical data or current data usage for the expected users, the increasing of the amount of available network resources including obtaining a respective user profile for each of the expected users, the respective user profile including information pertaining to at least one of the historical data or the current data usage for the expected user;
   monitoring an actual data usage of each of the expected users during the planned event;
   storing information pertaining to the actual data usage for each expected user; and
   using the stored information pertaining to the actual data usage for each expected user when adapting available network resources for at least one future event.

9. An apparatus for managing network resources of a communication network, the apparatus comprising controlling circuitry configured to cause:
   determination of a number of expected users to be physically present at a planned event, the expected users being associated with a network operator;
   increase of an amount of available network resources for the network operator in conjunction with the planned event based on the number of expected users and at least one of historical data or current data usage for the expected users, the increasing of the amount of available network resources including obtaining a respective user profile for each of the expected users, the respective user profile including information pertaining to at least one of the historical data or the current data usage for the expected user;
   monitoring of an actual data usage of each of the expected users during the planned event;
   storing of information pertaining to the actual data usage for each expected user; and
   use of the stored information pertaining to the actual data usage for each expected user when adapting available network resources for at least one future event.

10. The apparatus according to claim 9, wherein the planned event is a physical event associated with a geographical location being under coverage of the communication network.

11. The apparatus according to claim 9, wherein the respective user profile further comprises information pertaining to one of the historical and the current data usage in conjunction with one or more other events being of one of a same and a same similar type as the planned event for the expected user.

12. The apparatus according claim 9, wherein the controlling circuitry is configured to increase the amount of available network resources based on one or more of: a location of the planned event, timings associated with the planned event, an event type, a current network load, and a historical network load.

13. The apparatus according claim 9, wherein the expected users have registered to the planned event prior to the planned event through a registration portal associated with the planned event, and wherein the controlling circuitry is configured to cause determination of the number of expected users by causing acquirement of the number of expected users from the registration portal.

14. The apparatus according to claim 9, wherein the controlling circuitry is further configured to cause:
   determination, for each of the expected users, of whether the expected user is an active user and increasing the amount of available network resources in conjunction with the planned event based on a number of active users of the expected users associated with the network operator.

15. The apparatus according to claim 9, wherein the controlling circuitry is further configured to cause:
  determination of a total number of users expected to utilize network resources in conjunction with the planned event, wherein the total number of users comprises the number of expected users and other users associated with at least one other network operator.

16. A control node for a communication network, the control node comprising an apparatus, the apparatus comprising controlling circuitry configured to cause:
  determination of a number of expected users to be physically present at a planned event, the expected users being associated with a network operator;
  increase of an amount of available network resources for the network operator in conjunction with the planned event based on the number of expected users and at least one of historical data or current data usage for the expected users, the increasing of the amount of available network resources including obtaining a respective user profile for each of the expected users, the respective user profile including information pertaining to at least one of the historical data or the current data usage for the expected user;
  monitoring an actual data usage of each of the expected users during the planned event;
  storing information pertaining to the actual data usage for each expected user; and
  using the stored information pertaining to the actual data usage for each expected user when adapting available network resources for at least one future event.

* * * * *